(12) United States Patent
Yang

(10) Patent No.: US 9,650,282 B2
(45) Date of Patent: May 16, 2017

(54) GLASS FIBER WITH PROPERTIES OF HIGH STRENGTH, ENERGY SAVING, ENVIRONMENT PROTECTING AND LOW VISCOSITY, PRODUCTION METHOD THEREOF AND COMPOSITE MATERIAL CONTAINING THE SAME

(76) Inventor: Dening Yang, Shenzhen (CN)

( * ) Notice: Subject to any disclaimer, the term of this patent is extended or adjusted under 35 U.S.C. 154(b) by 605 days.

(21) Appl. No.: 13/985,525

(22) PCT Filed: Mar. 15, 2011

(86) PCT No.: PCT/CN2011/000411
§ 371 (c)(1),
(2), (4) Date: Aug. 14, 2013

(87) PCT Pub. No.: WO2011/113303
PCT Pub. Date: Sep. 22, 2011

(65) Prior Publication Data
US 2014/0128530 A1 May 8, 2014

(30) Foreign Application Priority Data
Feb. 23, 2011 (CN) .......................... 2011 1 0042787

(51) Int. Cl.
| C03C 13/06 | (2006.01) |
| C03C 13/00 | (2006.01) |
| C03B 37/02 | (2006.01) |
| C08J 5/04 | (2006.01) |

(52) U.S. Cl.
CPC .............. *C03B 37/02* (2013.01); *C03C 13/06* (2013.01); *C08J 5/043* (2013.01); *C08J 2300/00* (2013.01); *Y02P 40/57* (2015.11); *Y10T 428/298* (2015.01)

(58) Field of Classification Search
CPC ....... C03C 13/00; C03C 13/006; C03C 13/06; C03B 37/02; C08J 5/043; C08J 2300/00; Y02P 40/57; Y10T 428/298
See application file for complete search history.

(56) References Cited

U.S. PATENT DOCUMENTS

| 3,081,179 A | * | 3/1963 | Charvat ................. C03C 13/00 501/35 |
| 4,461,840 A | * | 7/1984 | Massol .................. C03C 13/00 501/36 |
| 5,332,699 A | * | 7/1994 | Olds ....................... C03C 13/00 501/36 |
| 5,614,452 A | * | 3/1997 | Clausen .................. A62D 3/40 106/699 |
| 5,932,500 A | | 8/1999 | Jensen et al. |
| 6,156,683 A | * | 12/2000 | Grove-Rasmussen .. C03C 13/00 501/35 |
| 6,284,684 B1 | * | 9/2001 | Vignesoult ............. C03C 13/00 501/36 |
| 6,346,494 B1 | * | 2/2002 | Jensen ................... C03C 13/00 501/35 |
| 2003/0181306 A1 | * | 9/2003 | Bernard .................. C03C 13/00 501/36 |
| 2007/0087139 A1 | | 4/2007 | Creux et al. |
| 2007/0253993 A1 | * | 11/2007 | Bruer ...................... C03C 13/00 424/422 |
| 2008/0191179 A1 | * | 8/2008 | Bernard .................. C03C 13/00 252/601 |
| 2008/0276652 A1 | * | 11/2008 | Bauer ..................... C03B 5/2356 65/454 |
| 2009/0286440 A1 | | 11/2009 | Lecomte et al. |
| 2012/0178610 A1 | * | 7/2012 | Hublikar ................ C03C 3/091 501/32 |
| 2012/0186491 A1 | * | 7/2012 | Cuypers .................. C03B 3/02 106/439 |

FOREIGN PATENT DOCUMENTS

| CN | 1162950 A | 10/1997 |
| CN | 1802327 A | 7/2006 |
| CN | 101119939 A | 6/2008 |
| CN | 101580344 A | 11/2009 |
| JP | 5864243 | 4/1983 |
| SU | 455072 | 3/1975 |

OTHER PUBLICATIONS

International Search Report for PCT/CN2011/000411.

* cited by examiner

*Primary Examiner* — Elizabeth A Bolden

(57) ABSTRACT

An application of glass fiber with low viscosity, high strength and energy saving, whose nominal diameter goes between 5-13 μm, the deviation value of the diameter of the said glass fiber is within ±15% of the nominal diameter, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 20-39%, $Fe_2O_3$ 0.01-3%, $Na_2O$ 0.01-8.8%, $B_2O_3$ 0-10%, MgO 7-20% and $F_2O$ 0%, wherein the content of $SiO_2$ is 1.9-4.1 times that of CaO, and the content of CaO is 1-1.8 time(s) that of MgO.

7 Claims, 1 Drawing Sheet

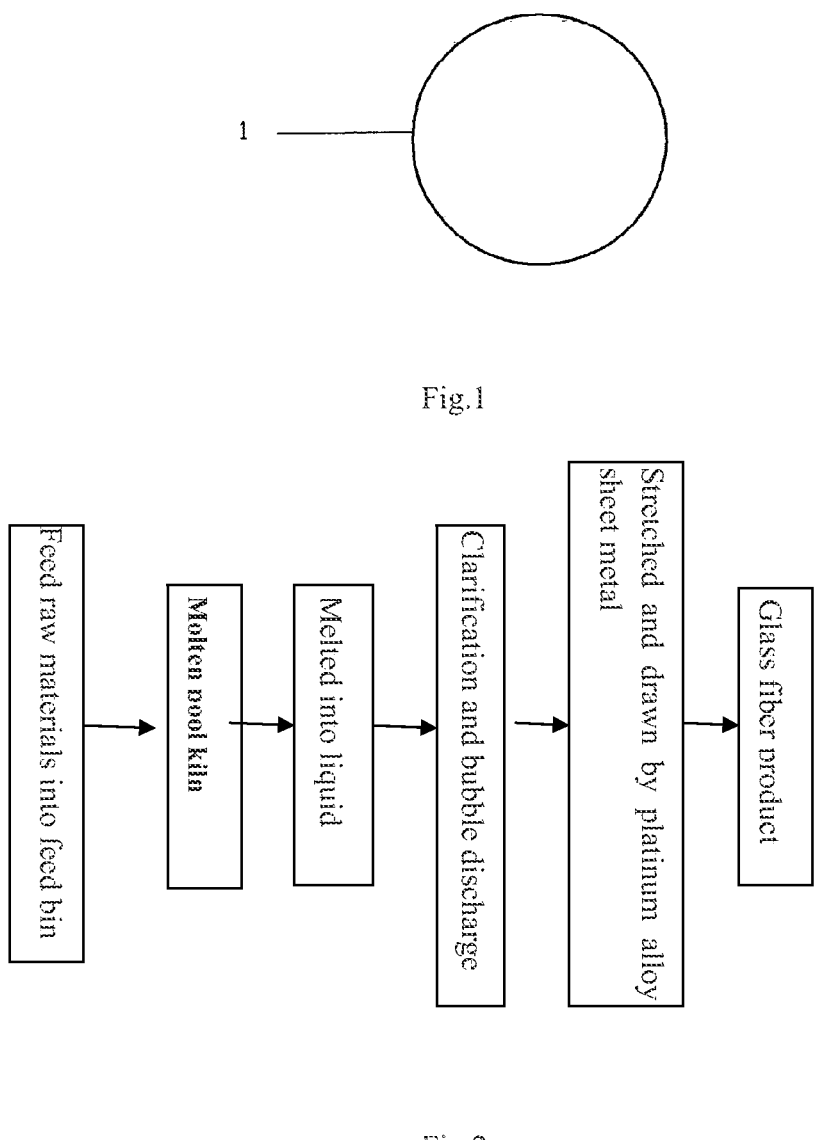

GLASS FIBER WITH PROPERTIES OF HIGH STRENGTH, ENERGY SAVING, ENVIRONMENT PROTECTING AND LOW VISCOSITY, PRODUCTION METHOD THEREOF AND COMPOSITE MATERIAL CONTAINING THE SAME

CROSS REFERENCE TO RELATED APPLICATIONS

This application claims priority to the following patent applications (1) Patent Cooperation Treaty Application PCT/CN2011/000411 filed Mar. 5, 2011; (2) Chinese Application No. 20110042787.4 filed Feb. 23, 2011; each of the above cited application if hereby incorporated by reference of herein as if fully set forth in its entirety.

BRANCH OF TECHNOLOGY

The present invention relates to a glass fiber which features high strength, energy saving, emission reduction, environmental protection and low viscosity, preparation methods thereof and a glass fiber composite material, specifically, the nominal diameter of the said glass fiber goes between 5-13 μm, and the deviation value of the diameter of the said glass fiber is within ±15% of the nominal diameter, the present invention also relates to a technical solution providing preset indispensable compositions with new range of choice of $Na_2O$, $Fe_2O_3$, $Al_2O_3$, $SiO_2$, CaO, MgO or $TiO_2$ and BaO in a special scope, and providing a change in the ratio of preset $SiO_2$, CaO and MgO, which is an innovative solution compared with the prior art featuring a narrow selection of the ratio of silicon, calcium and magnesium end values, it overcomes the technical prejudice that sodium or boron is deemed necessary to form the fluxing composition. the key lies in that the technical solution is invented with sodium or boron element omitted and that a combined invention is disclosed by adding high $Al_2O_3$ content. it delivers unexpected effects in low viscosity temperature, property of eutectoid with high $Al_2O_3$ content, even diameters of products, high quality, high strength increased by 1-3 times, prolonged service life of equipment, improved productivity, environmental protection, energy saving and emission reduction.

BACKGROUND ART

Existing glass fiber and glass fiber composite products:
1. High and medium-alkali glass fiber: calculated as per weight percentage, it contains about $SiO_2$ 67%, MgO 1%, CaO 9.5%, $Al_2O_3$ 5-7%, $Na_2O$ 2-10%, $F_2O$ 0.5%, $B_2O_3$ 3%, and BaO 2%; the defects of its product lie in high viscosity in the production process and huge energy consumption during production, when the diameter of glass fiber is ≤9 μm, the breaking strength (N/tex) is weak, which is usually below 0.4, so it is necessary to overcome it.
2. Alkali-free glass fiber: calculated as per weight percentage, the said alkali-free glass fiber contains about $SiO_2$ 55%, MgO 3%, CaO 19%, $Al_2O_3$ 14%, $Na_2O$ 1% and $B_2O_3$ 8-14%; the defects of its products lie in high viscosity, energy consumption and emission of poison gas from boron during production; when the glass fiber diameter is ≤9 μm, the difference of breaking strength (N/tex) value is usually 0.4 or so, which shall be overcome.
3. Domestic S high-strength glass fiber: calculated as per weight percentage, the said domestic S high-strength glass fiber contains about $SiO_2$ 63%, CaO 0.3%, MgO 14%, $Al_2O_3$ 25% and $B_2O_3$ 2%; the defects of its products lie in that when the glass fiber diameter is ≤9 μm, the difference of breaking strength (N/tex) value is usually 0.7-0.8, which shall be overcome. The products feature high viscosity and energy consumption, but low productivity with about 1000 tons annually produced by a line. In addition, cold repair for production lines is required every year for such high temperature & aluminum production process, which increases the cost and thus needs to be overcome.
4. Foreign S high-strength glass fiber: calculated as per weight percentage, the said foreign S high-strength glass fiber contains about $SiO_2$ 65%, MgO 10% and $Al_2O_3$ 25%; when the glass fiber diameter is ≤9 μm, the difference of breaking strength (N/tex) value is usually within 0.9.
5. In particular, for the wind blade material of the glass fiber composite material, the swept areas of the wind blades are limited due to low strength of glass fiber used, or high cost and low output of the S glass fiber, which greatly constrains the conversion of wind energy into electrical energy, thus increasing the cost of wind power generation, the cost is much higher than that of thermal power and hydropower generation. Therefore, it needs to improve the cost performance and strength of high-strength glass fiber products in a bid to reduce the cost of wind power generation fundamentally, which is a major problem that is expected to be solved but fails to be solved.
6. All kinds of alkali-free boron glass fiber at home and abroad now contain 6-10% boron, so a lot of poison gas with boron is emitted during production, which pollutes the environment seriously.
7. The existing alkali-free fluorine glass fiber contains $F_2O$ 6-10% and $Al_2O_3$ 8-18%, which leads to problems such as environmental pollution, low productivity and low strength of products.
8. In the prior art, alkaline-resistant zirconium glass fiber for reinforcing cement features low output, high viscosity temperature, and low breaking strength (about 0.4 N/tex), which impairs the effect of reinforcing cement.

SUMMARY

In view of the above prior art defects and shortcomings, the inventor makes positive research and innovation to overcome the prior art shortcomings and defects based on the practical experience and expertise for years in design and manufacturing of this kind of product; after solving the complex problems in production process, a special technical solution is proposed: the nominal diameter of the glass fiber goes between 5-13 μm and the diameter deviation value of the glass fiber is within ±15% of the nominal diameter; when the glass fiber diameter is ≤9 μm, the breaking strength (N/tex) is 0.45-1.3; the technical solution provides a change in the ratio of preset $SiO_2$, CaO and MgO, which is an innovative solution compared with the prior art featuring a narrow selection of the ratio of silicon, calcium and magnesium end values, and overcomes the technical prejudice that sodium or boron is deemed necessary to form the fluxing composition. The key point lies in that, it adopts the technical solution for technical element omission of sodium or boron in the invention, a new technical solution of combined element invention is formed together with the selection invention for $Al_2O_3$ in a scope of high content, it produces the unexpected product properties with low viscosity temperature and fluxing function with high $Al_2O_3$ content, the diameter of the product is even and features enhanced quality, the strength increased by 1-3 time(s), long service life of equipment and high production efficiency, a glass fiber which features high strength, energy saving, emission reduction, environmental protection and low viscosity with such technical effect such environmental protection, energy saving and emission reduction and its preparation method as well as the composite material using the said glass fiber.

The first embodiment of the present invention provides a glass fiber which features high strength, energy saving, emission reduction, environmental protection and low viscosity, whose nominal diameter goes between 5-13 μm, the deviation value of the diameter of the said glass fiber is within ±15% of the nominal diameter, wherein, the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-39%, $Fe_2O_3$ 0.01-3%, $Na_2O$ 0.01-8.8%, $B_2O_3$ 0-10%, MgO 8.1-20% and $F_2O$ 0-1%, wherein the content of $SiO_2$ is 1.9-4.1 times that of CaO, and the content of CaO is 1.2-1.6 times that of MgO.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, when its diameter is ≤9 μm, the breaking strength (N/tex) is 0.45-1.3.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 19-39%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,550° C.-1,700° C.; when the viscosity is $10^{0.5}$ Pa·s, the temperature of the glass fiber is 1,450° C.-1,620° C.; when the viscosity is $10^2$ Pa·s, the temperature of the glass fiber is 1,210° C.-1,480° C.; when the viscosity is $10^3$ Pa·s, the temperature of the glass fiber is 1,070° C.-1,160° C.; when the diameter of the said glass fiber is ≤9 μm, the breaking strength (N/tex) is 0.6-1.3.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-30%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,500° C.-1,640° C.; when the viscosity is $10^1$ Pa·s, the temperature of the glass fiber is 1,450° C.-1,580° C.; when the viscosity is $10^2$ Pa·s, the temperature of the glass fiber is 1,210° C.-1,350° C.; when the viscosity is $10^3$ Pa·s, the temperature of the glass fiber is 1,070° C.-1,230° C.; when the diameter of the said glass fiber is ≤9 μm, the breaking strength (N/tex) is 0.45-1.1.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-19%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,500° C.-1,580° C.; when the viscosity is $10^1$ Pa·s, the temperature of the glass fiber is 1,450° C.-1,520° C.; when the viscosity is $10^2$ Pa·s, the temperature of the glass fiber is 1,210° C.-1,310° C.; when the viscosity is $10^3$ Pa·s, the temperature of the glass fiber is 1,070° C.-1,160° C.; when the diameter of the said glass fiber is ≤9 μm, the breaking strength (N/tex) is 0.45-0.7.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-39%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,550° C.-1,700° C.; when the viscosity is $10^1$ Pa·s, the temperature of the glass fiber is 1,450° C.-1,620° C.; when the viscosity is $10^2$ Pa·s, the temperature of the glass fiber is 1,210° C.-1, 480° C.; when the viscosity is $10^3$ Pa·s, the temperature of the glass fiber is 1,070° C.-1,330° C.; when the diameter of the said glass fiber is ≤9 μm, the breaking strength (N/tex) is 0.45-1.3.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 26-39%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,610° C.-1,710° C.; when the viscosity is $10^1$ Pa·s, the temperature of the glass fiber is 1,500° C.-1,640° C.; when the viscosity is $10^2$ Pa·s, the temperature of the glass fiber is 1,310° C.-1,490° C.; when the viscosity is $10^3$ Pa·s, the temperature of the glass fiber is 1,200° C.-1,340° C.; when the diameter of the said glass fiber is ≤9 μm, the breaking strength (N/tex) is 0.75-1.3.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, calculated as per weight percentage, the content of $ZrO_2$ in the said glass fiber is 1-25%.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, (1) calculated as per weight percentage, in its product contents: ① MgO is 7-20%; ② the content of CaO is 1.0-1.8 time(s) that of MgO; ③ $SiO_2$ is 2.6-5.6 times that of MgO; ④ $SiO_2$ is 2.2-3.8 times that of CaO; ⑤ $Al_2O_3$ is 0.1-30%; ⑥ $Na_2O$ is 0-18%; ⑦ BaO is 0-5%; (2) strain point temperature of its product goes between 560° C.-720° C.; (3) the water absorption of its product goes between 0-0.001%; (4) calculated as per weight percentage, the total content of MgO, CaO and $SiO_2$ in its product is 51%-100%.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, (1) calculated as per weight percentage, in its product contents: ① the content of CaO is 0.6-2.4 times that of MgO, ② the content of $SiO_2$ is 1.3-5.8 times that of MgO, ③ the content of $SiO_2$ is 1.3-5.8 times that of CaO, ④ the content of $Al_2O_3$ is 0.1-30%, ⑤ the content of $Na_2O$ is 0-18%, ⑥ the content of BaO is 0-20%; (2) the total content of MgO, CaO and $SiO_2$ in its product is 51%-99.9%; (3) the water absorption of its product goes between 0-0.001%.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, (1) calculated as per weight percentage, in its product contents: ① the content of MgO is 7-20%, ② the content of CaO is 1.0-1.8 time(s) that of MgO, ③ the content of $SiO_2$ is 2.6-5.6 times that of MgO, ④ the content of $SiO_2$ is 2.2-3.8 times that of CaO, ⑤ the content of $Al_2O_3$ is 0.1-30%, ⑥ the content of $Na_2O$ is 0-18%, ⑦ the content of BaO is 0-5%; (2) the strain point temperature of its product goes between 560° C.-720° C.; (3) the water absorption of its product goes between 0-0.001%; (4) calculated as per weight percentage, the total content of MgO, CaO and $SiO_2$ in its product is 51%-99.9%.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, calculated as per weight percentage, in its product: the content of CaO is 1.15-1.8 times that of MgO.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, (1) calculated as per weight percentage, in its product contents: ① the content of MgO is 9.1-22%, ② the content of CaO is 0.6-2.0 times that of MgO, ③ the content of $SiO_2$ is 2.8-5.6 times that of MgO, ④ the content of $SiO_2$ is 2.3-3.8 times that of CaO, ⑤ the content of $Al_2O_3$ is 0.1-30%, ⑥ the content of $Na_2O$ is 0-18%, ⑦ the content of BaO is 0-5%; (2) the strain point temperature of its product goes between 560° C.-720° C.; (3) the water absorption of its product goes between 0-0.001%; (4) calculated as per weight percentage, the total content of MgO, CaO and $SiO_2$ in its product is 51%-99.9%.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, calculated as per weight percentage, when the content of $Al_2O_3$ in its product is 0-3.8%: the melting process temperature is 1,300° C.-1,400° C. at $10^1$ Pa·s; the process temperature for clarified and bubble discharge is 1,120° C.-1,260° C. at $10^2$ Pa·s; the forming process temperature is 1,010° C.-1,060° C. at $10^3$ Pa·s; the flexural strength of its product is up to 60-100 Mpa.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, calculated as per weight percentage, when the content of $Al_2O_3$ in its product is 3.8-15%: the melting process temperature is 1,320° C.-1,430° C. at $10^1$ Pa·s; the process temperature for clarified and bubble discharge is 1,140° C.-1,290° C. at $10^2$ Pa·s; the forming process temperature is 1,040° C.-1,130° C. at $10^3$ Pa·s; the flexural strength of its product is up to 80-130 Mpa.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, calculated as per weight percentage, when the content of $Al_2O_3$ in its product is 15-23%: the melting process temperature is 1,360° C.-1,550° C. at $10^1$ Pa·s; the process temperature for clarified and bubble discharge is 1,250° C.-1,430° C. at $10^2$ Pa·s; the forming process temperature is 1,060° C.-1,200° C. at $10^3$ Pa·s; the flexural strength of its product is up to 100-180 Mpa.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, calculated as per weight percentage, in the said glass, the content of $SiO_2$ is 2.6-5 times that of MgO, and the content of $SiO_2$ is 2.4-3.4 times that of CaO.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, a glass fiber reinforced cement material, which contains cement matrix and the glass fiber reinforced cement material which is embedded into the cement matrix and particularly contains $ZrO_2$ 1-25% as set forth in any of the above embodiments.

According to the glass fiber which features high strength, energy saving, emission reduction, environmental protection and low viscosity in the first embodiment of the present invention, the nominal diameter of the said glass fiber goes between 5-13 μm, the deviation value of the diameter of the said glass fiber is within ±15% of the nominal diameter, wherein, a glass fiber composite material, which contains plastic matrix and the glass fiber composite material which is embedded into the plastic matrix and manufactured with the glass fiber as set forth in the above embodiments.

The second embodiment of the present invention provides a preparation method for the glass fiber which features high strength, energy saving, emission reduction, environmental protection and low viscosity, whose nominal diameter goes between 5-13 μm, the deviation value of the diameter of the said glass fiber is within ±15%, wherein, step 1: all preset and indispensable compositions in a special scope such as $Na_2O$, $Fe_2O_3$, $Al_2O_3$, $SiO_2$, CaO, MgO or $TiO_2$ and BaO and raw materials whose special ratios are preset among $SiO_2$, CaO and MgO in the innovative technical solution are configured by the said glass fiber formula as set forth in any of claims 1 to 8; after being mixed and stirred, they are melted under the melting temperature for each glass formula to form the liquid glass fiber with preset viscosity, then they are homogenized and clarified and discharge bubbles to form flowing molten mass; step 2: the melted glass fibrous body formed in step 1 is stretched to be the glass fiber at medium and high speed through several holes of a multi-hole refractory metal sheet; after being cooled, the said glass fiber product is manufactured.

According to the method of the second embodiment of the present invention, wherein, when the viscosity is $10^{0.5}$ Pa·s, the temperature of the said glass fiber is 1,530° C.-1,700° C.; when the viscosity is $10^{0.5}$ Pa·s, the temperature of the glass fiber is 1,430° C.-1,620° C.; when the viscosity is $10^2$ Pa·s, the temperature of the glass fiber is 1,180° C.-1,480° C.; when the viscosity is $10^3$ Pa·s, the temperature of the glass fiber is 1,070° C.-1,320° C.

It should be noted here that the breaking strength of the glass fiber, in the summary and priority of the present invention, is not measured then, instead only the flexural strength of the material is measured; therefore the flexural strength of the material is described in the priority.

DESCRIPTION OF FIGURES

FIG. 1 is a normal section diagram of a glass fiber which features high strength, energy saving, emission reduction, environmental protection and low viscosity.

FIG. 2 is a flow diagram of preparation process of a glass fiber which features high strength, energy saving, emission reduction, environmental protection and low viscosity.

DESCRIPTION OF FIGURE MARKS

1: A glass fiber product of high strength, energy saving, environment protection and low viscosity

EMBODIMENTS

The glass fiber made by the prior art generally considers $SiO_2$ as the main matrix or skeleton, limiting the viscosity temperatures. The technical solutions of the present invention innovatively adopt $Al_2O_3$, $SiO_2$, MgO, CaO, $Na_2O$, $Fe_2O_3$ and $TiO_2$ to form the main composition of glass fiber, which is with fluxing and eutectic properties. The glass fiber which features high strength, energy saving, emission reduction, environmental protection and low viscosity according to the embodiment of the present invention is different from the glass fiber made by the prior art in terms of compositions and performance. A detailed description for the embodiments of the present invention is given as follows.

The First Embodiment

Based on the first embodiment of the present invention, the nominal diameter of the glass fiber goes between 5-13 μm and the diameter deviation value of the glass fiber is within ±15% of the nominal diameter, characterized in that:

The said glass fiber contains $Al_2O_3$, $SiO_2$, MgO, CaO, $TiO_2$, $Fe_2O_3$ and $Na_2O$, wherein, calculated as per weight percentage, the said glass fiber contains $Al_2O_3$ 10-39%, $Fe_2O_3$ 0.01-3%, $Na_2O$ 0.01-8.8%, $B_2O_3$ 0-10%, MgO 8.1-20% and $F_2O$ 0-1%, and the content of $SiO_2$ is 1.9-4.1 times that of CaO, and the content of CaO is 1.2-1.6 times that of MgO.

The preparation method is characterized in that: Step 1: All preset and indispensable compositions in a special scope such as $Na_2O$, $Fe_2O_3$, $Al_2O_3$, $SiO_2$, CaO, MgO or $TiO_2$ and BaO and raw materials whose special ratios are preset among $SiO_2$, CaO and MgO in the innovative technical solution are required by any of the said glass fiber formula and configuration as set forth in any of claims 1 to 8; after being mixed and stirred, they are melted under the melting temperature for each glass fiber formula to form the liquid glass fiber with preset viscosity; then, they are homogenized and clarified and discharge bubbles to form flowing molten mass;

Step 2: the melted glass fibrous body formed in Step 1 is stretched to be the glass fiber at medium and high speed through several holes of a multi-hole refractory metal sheet; after being cooled, the said glass fiber product is manufactured.

On the premise of adopting stretching and spinning process, the present invention also adopts the foregoing brand new technical solution for the compositions whose special ratios are preset, changing many technical prejudices to the prior art and solving technical difficulties that are expected to be solved but fail to be solved. For a glass fiber product, under the premise of overcoming the abovementioned high breaking strength and certain deviation of the nominal diameter, several technical effects that reduce the viscosity temperature and deal with environmental issues are described in details. Moreover, in the prior art, although the strength of the glass fiber can be improved by adding abundant $Al_2O_3$, the melting temperature and temperatures at various viscosities are increased. Firstly, the $Al_2O_3$ to be added is limited up to 25%; secondly, when 25% $Al_2O_3$ is added, production cannot be realized by using an ordinary alkaliferous boron-free glass device. Appropriate amount of $Al_2O_3$ can be added to the glass fiber as set forth in the embodiment based on the requirements for strength and temperatures at various viscosities (unless otherwise specified in the specification, the contents of all compositions of the glass are calculated as per weight percentage).

Viscosity Performance

The viscosity of the embodiments of the present invention is measured by THETA high-temperature rotary viscosimeter from USA.

When compared with several key viscosity data (in case of about 30% $Al_2O_3$):

(1) Melting temperature: According to the embodiment of the present invention, the temperature of the glass fiber which features high strength, energy saving, emission reduction, environmental protection and low viscosity is 1,480° C.-1,680° C. when the viscosity is $10^{0.5}$ Pa·s; the temperature of the glass fiber which features high strength, energy saving, emission reduction, environmental protection and low viscosity is 1,420° C.-1,600° C. when the viscosity is $10^1$ Pa·s.

In the prior art, the viscosities of the said medium-alkali glass fiber, C fiber, E alkali-free boron glass fiber and S high-strength glass fiber products cannot be measured by THETA high-temperature rotary viscosimeter from USA as the melting temperatures at viscosities of $10^{0.5}$ Pa·s and $10^1$ Pa·s are above 1600° C.

The melting viscosity temperature (maximum) of the present invention is 100° C.-300° C. lower than that of the E or medium-alkali glass fiber, C glass fiber and S glass fiber products of the prior art after 20% or 30% $Al_2O_3$ is added to improve the viscosity dramatically, and more than 200° C. lower than that of the medium-alkali glass fiber and C fiber after about 5-8% $Al_2O_3$ is added. The insiders obviously know that this has the following advantages:

Firstly, it has a technical advantage thanks to energy saving; since the energy consumption is mainly in the high-temperature area, it can save 30-40% energy by reducing 200° C. melting temperature;

Secondly, it has a technical advantage of high-quality melting and minimum defects;

Thirdly, since the melting temperature is greatly reduced, the erosion to refractory materials is greatly reduced, which will significantly prolong the service life of the smelter and greatly reduce the cold repair time and expense that severely affect the production output. For example, S glass fiber requires cold repair every 1-2 years, which results in stopping production at least for 2-3 months; for another example, E boron fiber requires cold repair every 3-4 years due to 6-10% content of boron, which results in stopping production for 2-3 months; moreover, as the refractory materials used are high-zirconia materials, the material cost is 3-4 times higher and a large number of materials need to be replaced every 1-2 years or 3-4 years; the service life of the molten pool for manufacturing the glass fiber in the embodiment of the present invention is longer than that of the medium-alkali glass fiber, and the viscosity of the glass fiber in the embodiment of the present invention is lower than that of the existing glass fiber, thus, it can be used at least for 5-8 years before the cold repair is conducted.

(2) Bubble discharge and clarification viscosity temperature: The present invention covers a preferred embodiment with more than 20% $Al_2O_3$, for which, the temperature is 1180° C.-1280° C. when the viscosity is $10^2$ Pa·s; however, the forming temperature of the existing medium-alkali glass fiber with only 5% $Al_2O_3$ is above 1380° C. when the viscosity is $10^2$ Pa·s.

For all kinds of E alkali-free glass fiber, E boron glass fiber with about 15% content of aluminum and S glass fiber in particular, difficulties are found in melting, homogenization and bubble discharge, hence, the processes to add oxygen blowing, bubble discharge and shallow pool equipment are proposed, which have high cost and low efficiency.

Breaking strength performance (measured in accordance with CB/T7690 2)

(Remark: Comparison of all of the following breaking strengths is made at the premise that the nominal diameter of the glass fiber is ≤9 μm)

The insiders obviously know that the breaking strength of the glass fiber mainly depends on the content of $Al_2O_3$ which as a composition plays a key role in the strength of the net structure of the product; the strength of the net structure is proportional to the content of $Al_2O_3$ and inversely proportional to boron content as the boron is easy to volatilize to make the compositions uneven, resulting in damage to and loosening of the net structure.

According to the embodiment of the present invention, it can be learned from the above description of viscosity that, when 25-30% $Al_2O_3$ is added, the viscosity of the present invention is still lower than that of the prior art; in addition, the technical control can be realized in a certain range. The advantages of the breaking strength of the present invention lie in that compared with the glass fiber of same type, the glass fiber of the present invention has better viscosity performance at temperatures of 150° C.-250° C.; with same viscosity temperature and equipment as the prior art, 10%-15% (or more) $Al_2O_3$ can be added, thus greatly increasing the chances for improving the breaking strength.

(1) The high- and medium-alkali glass fiber products only contain about 5% $Al_2O_3$, and a great deal of $Al_2O_3$ is not suggested to be added due to its technical solutions; otherwise, production cannot be implemented due to extremely high viscosity; the breaking strength is about 0.4 (N/tex) when the nominal diameter is ≤9 μm. In the present invention, up to 25% $Al_2O_3$ may be added in case of same viscosity temperature and processing equipment to increase the breaking strength by 50-100%.

(2) For E alkali-free glass fiber, after about 15% $Al_2O_3$ is added, no more $Al_2O_3$ shall be added because the viscosity is too high; the breaking strength is about 0.45 (N/tex) when the nominal diameter is ≤9 μm. However, thanks to its low viscosity, the present invention can be added with 25%-30% $Al_2O_3$ at same viscosity temperature; moreover, the net structure of the product will not become loose because no boron is contained, while the breaking strength will be increased by 80-130%.

(3) S glass fiber can be added with up to 26% $Al_2O_3$ due to its viscosity performance, so the breaking strength is only about 0.7-0.8 (N/tex) when the nominal diameter of the glass fiber is ≤9 μm. In the present invention with advantage of low viscosity, 30%-39% $Al_2O_3$ may be added in case of same viscosity temperature and processing equipment to increase the breaking strength by 50-80%.

Environmental Performance

In the production process, the existing E boron glass fiber (occupying 90% of total glass fiber in the world) contains boron 8-12%; due to great volatilization (for example: if 10% boron is ensured, the raw materials containing 25-30% boron will be added and volatilize 15-20% during melting when fluxing function works), poisonous boron gas is generated. The present invention does not necessarily require boron addition, the melting with lower viscosity temperature can be ensured, therefore it can fundamentally solve the environmental problems in the production of E boron glass fiber which occupies more than 90% of the glass fiber output in the world.

Water content (measured in accordance with GB/T9914.1)

The water content of the glass fiber as set forth in the embodiment of the present invention is 0-0.5%.

Fiber diameter (measured in accordance with GB/T7690.5)

The deviation value of the nominal diameter of the glass fiber as set forth in the embodiment of the present invention is within ±15% and even ±10% due to controllable viscosity.

To detail the technical solutions of the embodiment of the present invention, Tables 1, 2 and 3 list the formulas and corresponding performances specifically.

TABLE 1

|  | Sample 1 |
|---|---|
| Nominal diameter (μm) | About 9 |
| Deviation value of nominal diameter | Within ±15% |
| SiO$_2$: CaO | About 2.0 |
| CaO: MgO | About 1.49 |
| MgO content (wt %) | 14.1 |
| CaO content (wt %) | 21 |
| SiO$_2$ content (wt %) | 43 |
| Total content of SiO$_2$, CaO and MgO (wt %) | 78.1 |
| Fe$_2$O$_3$ content (wt %) | 0.2 |
| Al$_2$O$_3$ content (wt %) | 20 |
| Na$_2$O content (wt %) | 0.4 |
| BaO content (wt %) | 1 |
| B$_2$O$_3$ content (wt %) | / |
| TiO$_2$ content (wt %) | 0.3 |
| Water content (%) | Within 0.5 |
| Breaking strength (N/tex) when the diameter is ≤9 μm | About 0.65 |
| Melting process temperature (° C.) at $10^{0.5}$ Pa · s | About 1560 |
| Melting process temperature (° C.) at $10^1$ Pa · s | About 1470 |
| Clarification, bubble discharge process temperature (° C.) at $10^2$ Pa · s | About 1235 |
| Forming process temperature (° C.) at $10^3$ Pa · s | About 1115 |

*It can be measured by calculation but not by high-temperature rotary viscosimeter.

TABLE 2

| Sample No. | Sample 5 | Sample 6 | Sample 7 | Sample 8 | Sample 9 | Sample 10 | Sample 11 | Comparison 12 |
|---|---|---|---|---|---|---|---|---|
| Nominal diameter (μm) | About 9 | About 9 | About 9 | About 9 | About 9 | About 9 | About 9 | About 9 |
| Deviation of nominal | Within ±15% | Within ±15% | Within ±15% | Within ±15% | Within ±15% | Within ±15% | Within ±15% | Within ±15% |
| SiO$_2$: CaO | About 2.0 | About 2.5 | About 2.1 | About 2.3 | About 2.5 | About 2.9 | About 3.3 | About 2 |
| CaO: MgO | About 1.3 | About 1.4 | About 1.3 | About 13.6 | About 1.4 | About 1.4 | About 1.3 | About 1.4 |
| MgO content (wt %) | 13.9 | 11.7 | 11.5 | 10.7 | 9.8 | 10.4 | 11 | 18 |
| CaO content (wt %) | 18.6 | 16.2 | 15 | 14.5 | 13.4 | 14.8 | 14.1 | 25 |
| SiO$_2$ content (wt %) | 38 | 40 | 32 | 33 | 34 | 43.5 | 46 | 51 |
| Total content of SiO$_2$, CaO and MgO (wt %) | 70.5 | 67.9 | 58.5 | 58.2 | 57.2 | 68.7 | 71.1 | 94 |
| Fe$_2$O$_3$ content (wt %) | 0.1 | 0.3 | 0.1 | 0.2 | 0.1 | 0.1 | 1.3 | 0.2 |
| Al$_2$O$_3$ content (wt %) | 28 | 29 | 35 | 33 | 34 | 31 | 26 | 3 |
| Na$_2$O content (wt %) | 0.8 | 0.8 | 0.1 | 0.5 | 0.2 | 0.1 | 0.3 | 1 |
| BaO content (wt %) | 0.5 | 1 | 0.1 | 0.5 | 0.3 | / | 0.3 | 1 |
| B$_2$O$_3$ content (wt %) | / | / | 6 | 7 | 8 | / | / | / |
| TiO$_2$ content (wt %) | 0.1 | 1 | 0.2 | 0.6 | 0.2 | 0.1 | 1 | 0.8 |
| Water content (%) | Within 0.5 | Within 0.5 | Within 0.5 | Within 0.5 | Within 0.5 | Within 0.5 | Within 0.5 | Within 0.5 |
| Breaking strength (N/tex) when the diameter is ≤9 μm | About 0.95 | About 0.95 | About 1.15 | About 1.1 | About 1.15 | About 1.05 | About 0.8 | About 0.4 |
| Melting process temperature (° C.) at $10^{0.5}$ Pa · s | About 1655* | About 1640* | About 1700* | About 1690* | About 1690* | About 1660* | About 1630* | About 1540 |
| Melting process temperature (° C.) at $10^1$ Pa · s | About 1570 | About 1560 | About 1620* | About 1610* | About 1610* | About 1570 | About 1520 | About 1470 |
| Clarification, bubble discharge process temperature (° C.) at $10^2$ Pa · s | About 1330 | About 1330 | About 1480 | About 1460 | About 1465 | About 1340 | About 1330 | About 1230 |
| Forming process temperature (° C.) at $10^2$ Pa · s | About 1235 | About 1230 | About 1320 | About 1310 | About 1315 | About 1260 | About 1220 | About 1100 |

*It cannot be measured by high-temperature rotary viscosimeter; the values (if any) are made out by calculation.

TABLE 3

Comparison with the glass fiber made with the prior art

| Sample No. | The present invention | Medium-alkali glass fiber 1 | E glass fiber 2 | A glass fiber 3 | S glass fiber 4 | Fluorine glass fiber 5 | Comparison example 6 | Comparison example 7 |
|---|---|---|---|---|---|---|---|---|
| Nominal diameter (μm) | About 9 | About 9 | About 9 | About 9 | About 9 | About 9 | About 9 | About 9 |
| Deviation of nominal diameter | Within ±15% | Within ±15% | Within ±15% | Within ±15% | Within ±15% | Within ±15% | Within ±15% | Within ±15% |
| $SiO_2$: CaO | 2-3.6 times | About 7.0 | About 3.2 | About 2.5 | About 0.06 | About 3.1 | About 1.5 | About 5 |
| CaO: MgO | 1.3-1.6 times | About 9.5 | About 3.4 | About 8.9 | About 58 | About 2 | About 1.0 | About 1.8 |
| MgO content (wt %) | 8.1-20 | 1 | 5 | 3 | 15 | 7 | 28 | 7.2 |
| CaO content (wt %) | See | 9.5 | 16 | 8 | 1 | 22 | 28 | 13 |
| $SiO_2$ content (wt %) | See Table 1 | 67 | 55 | 71 | 58 | 44 | 42 | 65 |
| $Fe_2O$ content (wt %) | See Table 1 | / | / | / | / | 4 | / | / |
| $B_2O_3$ content (wt %) | 0-10 | 3.5 | 9 | | | | / | / |
| $Al_2O_3$ content (wt %) | 10-39 | 7 | 15 | 3 | 26 | 23 | 2 | 14.8 |
| $Na_2O$ content (wt %) | 0.01-8.8 | 12 | 0 | 15 | / | / | / | / |
| BaO content (wt %) | 0.01-14 | / | / | / | / | / | / | / |
| $Fe_2O_3$ content (wt %) | 0.01-3 | 0 | 0 | 0 | 0 | 0 | 0 | 0 |
| $TiO_2$ content (wt %) | 0.0003-4.9 | 0 | 0 | 0 | 0 | 0 | 0 | 0 |
| Melting process temperature (° C.) at $10^{0.5}$ Pa · s | About 1480-1700 | * | * | * | * | * | * | * |
| Melting process temperature (° C.) at $10^1$ Pa · s | About 1420-1620 | * | * | * | * | * | 1580 | 1520 |
| Clarification, bubble discharge process temperature (° C.) at $10^2$ Pa · s | About 1200-1480 | About 1400-1440 | About 1580-1640 | About 1400-1440 | * | * | 1480 | 1390 |
| Forming process temperature (° C.) at $10^2$ Pa · s | About 1060-1320 | About 1230-1280 | About 1360-1380 | About 1230-1280 | About 1380-1400 | About 1380-1400 | 1360 | 1340 |
| Water content (%) | Within 0.5 | Within 0.5 | Within 0.5 | Within 0.5 | Within 0.5 | Within 0.5 | Within 0.5 | Within 0.5 |
| Breaking strength (N/tex) when the diameter is ≤9 μm | About 0.4-1.3 | Less than 0.4 | About 0.5 | Less than 0.4 | About 0.8 | About 0.5 | About 0.4 | About 0.45 |

(* indicates that it cannot be measured by high-temperature rotary viscosimeter; the values (if any) are made out by calculation.)

Seen from Table 2, for the technical solutions of samples 5-11 of the present invention, the glass fiber contains $Al_2O_3$, $SiO_2$, MgO, CaO, $TiO_2$, $Fe_2O_3$ and $Na_2O$, wherein, calculated as per weight percentage, the said glass fiber contains $Al_2O_3$ 26-39%, $TiO_2$ 0.0003-4.9%, $Fe_2O_3$ 0.01-3%, $Na_2O$ 0.01-8.8%, $B_2O_3$ 0-10%, MgO 8.1-20% and $F_2O$ 0-1%, and the content of $SiO_2$ is 2-3.6 times that of CaO, and the content of CaO is 1.3-1.49 times that of MgO.

Seen from the above tables, the viscosity temperatures at all cases, especially when the viscosity is 10" Pa·s and $10^1$ Pa·s, are lower than that of products made with the prior art; after comparing samples 2, 4 and 5 in Table 3, we can know that the viscosity temperatures of samples added with 15-25% $Al_2O_3$ are 150° C.-250° C. lower than that of the prior art, which means the present invention can be added with 15-20% $Al_2O_3$ in case of same temperature and equipment to realize production at same viscosity and increase the breaking strength by 50-100%. After comparing samples 1 and 3 in Table 3, we can know that only 3-7% $Al_2O_3$ is added to the samples; yet, the present invention is added with 20-31% $Al_2O_3$ and even so its viscosity temperature is 100° C.-230° C. less, which can save energy and improve the quality of products.

Seen from Table 1, many samples of the present invention are not added with $B_2O_3$ and only contain up to 1% $Na_2O$; E boron glass fiber with new performance can be produced, which contains more $Al_2O_3$ and doubles the strength than E glass fiber that accounts for 95% of the world's total fiber production (the content of $B_2O_3$ is 8-15%); therefore, there is not a lot of poison gas from boron volatilizing during production, which well protects the environment.

The comparison example 12 only contains about 3% $Al_2O_3$, whose melting viscosity temperature is only 10° C.-30° C. or 30° C.-80° C. lower than that of samples with 26-31% $Al_2O_3$. From this, we can know that the technical solutions for the property of eutectoid consisting of aluminum, silicon, calcium and magnesium with high aluminum content have broken through the technical prejudice of the prior art that a great deal of $Al_2O_3$ cannot be added without boron and alkali; additionally, the viscosity in case of high aluminum content is improved compared with high sodium or boron content of the prior art; the technical solutions for about 1% or 8% aluminum have proven the property of eutectoid consisting of aluminum, silicon, calcium and magnesium with high aluminum content; within controllable small scope of the viscosity (under process conditions of 15° C.-20° C. lower than that of the prior art), the breaking strength can be increased from 0.4 (N/tex) in case of 3% aluminum to 0.65 (N/tex), 0.8 (N/tex) or 1.05 (N/tex) in case of 26% or 31% aluminum.

In some of samples of the present invention, the content of ferrum goes between 1-1.3, and the contents of BaO and $TiO_2$ make it become non-transparent brown or claybank color so as to adapt to the glass fiber whose strength, viscosity temperature and strain points etc. are much better than that of the glass fiber made with the prior art; after 1-1.5% $Fe_2O_3$ or appropriate amount of BaO, $TiO_2$, MnO and CoO are added, it is able to produce a non-transparent blue, blue-green, tawny brown and black advanced material with high breaking strength and practical value; consequently, a new glass fiber product can be produced by cutting cost of the main materials by about 10 times.

Seen from each prior art or comparison examples in Table 3, the content of MgO in their technical solutions and the present invention is 8.1-20%; in terms of such compositions as aluminum, silicon, sodium, ferrum, titanium, magnesium and calcium, the ratio of silicon, magnesium and calcium as well as the entire technical solutions, there are 3-5 or 4-5 differences. Due to the discovery and innovation of the new properties in the technical solution of the present invention, it reflects its technical effect advantages in technical and quality control such as environmental protection, energy saving, emission reduction, production efficiency, cost reduction, advantaged strength, and viscosity temperature.

It is hereby noted that the viscosity in Table 1, Table 2 and Table 3 is measured by THETA high-temperature rotary viscosimeter from USA, breaking strength is measured in accordance with the standard stipulated in GB/T7690.2 or the measured values or calculated as per the relevant proportion of $Al_2O_3$ content. Moisture content is measured in accordance with GB/T9914.1.

Example 1

The glass fiber which features high strength, energy saving, emission reduction, environmental protection and low viscosity as set forth in the first embodiment of the present invention, characterized in that: when its diameter is ≤9 μm, the breaking strength (N/tex) is 0.45-1.3.

Example 2

The glass fiber which features high strength, energy saving, emission reduction, environmental protection and low viscosity as set forth in the first embodiment of the present invention, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 19-39%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,550° C.-1,700° C.; when the viscosity is $10^1$ Pa·s, the temperature of the glass fiber is 1,450° C.-1,620° C.; when the viscosity is $10^2$ Pa·s, the temperature of the glass fiber is 1,210° C.-1,480° C.; when the viscosity is $10^3$ Pa·s, the temperature of the glass fiber is 1,070° C.-1,160° C.; when the diameter of the said glass fiber is ≤9 μm, the breaking strength (N/tex) is 0.6-1.3.

Example 3

The glass fiber which features high strength, energy saving, emission reduction, environmental protection and low viscosity as set forth in the first embodiment of the present invention, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-30%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,500° C.-1,640° C.; when the viscosity is $10^1$ Pa·s, the temperature of the glass fiber is 1,450° C.-1,580° C.; when the viscosity is $10^2$ Pa·s, the temperature of the glass fiber is 1,210° C.-1,350° C.; when the viscosity is $10^3$ Pa·s, the temperature of the glass fiber is 1,070° C.-1,230° C.; when the diameter of the said glass fiber is ≤9 μm, the breaking strength (N/tex) is 0.45-1.1.

Example 4

The glass fiber which features high strength, energy saving, emission reduction, environmental protection and low viscosity as set forth in the first embodiment of the present invention, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-19%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,500° C.-1,580° C.; when the viscosity is $10^1$ Pa·s, the temperature of the glass fiber is 1,450° C.-1,520° C.; when the viscosity is $10^2$ Pa·s, the temperature of the glass fiber is 1,210° C.-1,310° C.; when the viscosity is $10^3$ Pa·s, the temperature of the glass fiber is 1,070° C.-1,160° C.; when the diameter of the said glass fiber is ≤9 μm, the breaking strength (N/tex) is 0.45-0.7.

Example 5

The glass fiber which features high strength, energy saving, emission reduction, environmental protection and low viscosity as set forth in the first embodiment of the present invention, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 8-39%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 that of MgO; when the viscosity is $10^{0.5}$ Pa·s, the temperature of the said glass fiber is 1,550° C.-1,700° C.; when the viscosity is $10^1$ Pa·s, the temperature of the glass fiber is 1,450° C.-1,620° C.; when the viscosity is $10^2$ Pa·s, the temperature of the glass fiber is 1,210° C.-1,480° C.; when the viscosity is $10^3$ Pa·s, the temperature of the glass fiber is 1,070° C.-1,330° C.; when the diameter of the said glass fiber is ≤9 μm, the breaking strength (N/tex) is 0.45-1.3.

Example 6

The glass fiber which features high strength, energy saving, emission reduction, environmental protection and low viscosity as set forth in the first embodiment of the present invention, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 26-39%, $Fe_2O_3$ 0.01-3%, $Na_2O$ 0.01-2%, $B_2O_3$ 0-10%, MgO 8.1-20% and $F_2O$ 0-1%, wherein the content of $SiO_2$ is 2.0-3.6 times that of CaO, and the content of CaO is 1.3-1.49 times that of MgO; when the viscosity is $10^{0.5}$ Pa·s, the temperature of the said glass fiber is 1,610° C.-1,710° C.; when the viscosity is $10^1$ Pa·s, the temperature of the glass fiber is 1,500° C.-1,640° C.; when the viscosity is $10^2$ Pa·s, the temperature of the glass fiber is 1,310° C.-1,490° C.; when the viscosity is $10^3$ Pa·s, the temperature of the glass fiber is 1,200° C.-1,340° C.; when the diameter of the said glass fiber is ≤9 μm, the breaking strength (N/tex) is 0.75-1.3.

Example 7

Based on the above first embodiment, it is limited that calculated as per weight percentage, the said glass fiber contains BaO 0.01-14%.

Example 8

Based on the above first embodiment, it is limited that calculated as per weight percentage, the said glass fiber contains $Al_2O_3$.

Example 9

Based on the above first embodiment, it is limited that calculated as per weight percentage, in the said glass fiber, the content of $SiO_2$ is 2.0-3.6 times that of CaO, the content of CaO is 1.3-1.6 times that of MgO, and the content of MgO is 8.1-20%.

Example 10

Based on the above first embodiment, it is limited that (1) calculated as per weight percentage, in its product contents: ① MgO is 7-20%, ② the content of CaO is 1.0-1.8 time(s) that of MgO, ③ $SiO_2$ is 2.6-5.6 times that of MgO, ④ $SiO_2$ is 2.2-3.8 times that of CaO, ⑤ $Al_2O_3$ is 0.1-30%, ⑥ $Na_2O$ is 0-18%, ⑦ BaO is 0-5%; (2) calculated as per weight percentage, the total content of MgO, CaO and $SiO_2$ in its product is 51%-100%. Its product has the following performances: the strain point temperature of its product goes between 560° C.-720° C.; the water absorption of its product goes between 0-0.001%.

Example 11

Based on the above first embodiment, it is limited that (1) calculated as per weight percentage, in its product contents: ① the content of CaO is 0.6-2.4 times that of MgO, ② the content of $SiO_2$ is 1.3-5.8 times that of MgO, ③ the content of $SiO_2$ is 1.3-5.8 times that of CaO, ④ the content of $Al_2O_3$ is 0.1-30%, ⑤ the content of $Na_2O$ is 0-18%, ⑥ the content of BaO is 0-20%; (2) the total content of MgO, CaO and $SiO_2$ in its product is 51%-99.9%. The water absorption of its product goes between 0-0.001%.

Example 12

Based on the above first embodiment, it is limited that the said glass fiber contains $SiO_2$, MgO and CaO, wherein, calculated as per weight percentage, in the said glass, the content of $SiO_2$ is 2.1-6.5 times that of MgO, $SiO_2$ is 1.8-4.6 times that of CaO; the said glass has the following performances:

The visible light transmittance of the said glass fiber goes between 65%-95%; the water absorption of the said glass fiber between 0-0.3%; the flexural strength of the said glass fiber is 50-180 MPa.

Example 13

The composite material of the glass fiber which features high strength, energy saving, emission reduction, environmental protection and low viscosity according to the first embodiment of the present invention, which contains plastic matrix and the glass fiber composite material which is embedded into the plastic matrix and manufactured with the glass fiber in above embodiment.

The Second Embodiment

The preparation method of the glass fiber which features high strength, energy saving, emission reduction, environmental protection and low viscosity according to the first embodiment of the present invention, wherein, the nominal diameter of the glass fiber goes between 5-13 μm and the diameter deviation value of the glass fiber is within ±15% of the nominal diameter; the preparation method is characterized in that:

Step 1: all preset and indispensable compositions in a special scope such as $Na_2O$, $Fe_2O_3$, $Al_2O_3$, $SiO_2$, CaO, MgO or $TiO_2$ and BaO and raw materials whose special ratios are preset among $SiO_2$, CaO and MgO in the innovative technical solution are configured by the said glass fiber formula as set forth in the first embodiment; after being mixed and stirred, they are melted under the melting temperature for each glass formula to form the liquid glass fiber with preset viscosity, then they are homogenized and clarified and discharge bubbles to form flowing molten mass;

Step 2: the melted glass fibrous body formed in Step 1 is stretched to be the glass fiber at medium and high speed through several holes of a multi-hole refractory metal sheet; after being cooled, the said glass fiber product is manufactured.

The performance during the process is as follows:

The temperature of the glass fiber is respectively 1480° C.-1680° C., 1410° C.-1600° C., 1180° C.-1340° C. and 1040° C.-1220° C. when the viscosity is $10^{0.5}$ Pa·s, $10^1$ Pa·s, $10^2$ Pa·s and $10^3$ Pa·s. To detail the technical solutions of the embodiment of the present invention, Tables 1 lists the formulas and corresponding performances of the glass fiber samples of high strength, energy saving, environment protection and low viscosity according to the embodiment of the present invention.

The Third Embodiment

The glass fiber which features high strength, energy saving, emission reduction, environmental protection and low viscosity according to the above embodiment of the present invention, the nominal diameter of the glass fiber goes between 5-13 μm and the diameter deviation value of the glass fiber is within ±15% of the nominal diameter, wherein, a glass fiber composite material, which contains plastic matrix and the glass fiber composite material which is embedded into the plastic matrix and manufactured with the glass fiber in above embodiment.

The composition and properties of the glass fiber which features high strength, energy saving, emission reduction, environmental protection and low viscosity according to the above embodiment of the present invention are described above, and the preparation method of the glass fiber which features high strength, energy saving, emission reduction, environmental protection and low viscosity according to the embodiment of the present invention is described below.

The Fourth Embodiment

FIG. 1 is a normal section diagram of the product of the glass fiber which features high strength, energy saving, emission reduction, environmental protection and low viscosity and preparation process thereof according to the embodiment of the present invention. It can be seen from the figure that mark 1 of the figure is a glass fiber product of high strength, energy saving, environment protection and low viscosity.

FIG. 2 is a flow diagram of preparation process of a glass fiber which features high strength, energy saving, emission reduction, environmental protection and low viscosity. It can be seen from the figure that its forming process flow is to (1) put the preset prepared raw materials into the feed bin; (2) convey the raw materials in feed bin to the molten pool kiln; (3) melt them in the molten pool at preset temperature and discharge the bubbles; and (4) stretch the liquid molten mass through the platinum alloy wire-drawing plate to form glass fiber, finally, the production is finished after drying.

A further description of the preparation process and stretching and spinning process of a glass fiber product of high strength, energy saving, environment protection and low viscosity is given, and its manufacturing process comprises the following steps:

(1) First, prepare the raw materials; the raw material ratio is calculated according to the above first embodiment, its modifications and the compositions of a glass fiber product of high strength, energy saving, environment protection and low viscosity in the examples.

(2) Prepare the production line equipment such as raw material bin, molten pool kiln, multi-hole platinum alloy wire-drawing plate required by stretching and spinning process.

(3) Based on the production flow shown in FIG. 2, put the preset raw materials prepared in step (1) into the feed bin, and then convey the raw materials in the feed bin to the molten pool kiln, melt them in the molten pool at preset temperature and discharge the bubbles to form liquid molten mass;

Two options for the process are available:

For one option, the forming process by spinning: stretch the glass molten mass through spinning holes of the platinum alloy wire-drawing plate to form a glass fiber product of high strength, energy saving, environment protection and low viscosity of the present invention.

For the other option, prepare glass marbles by marble forming process, and then convey the glass marbles to the crucible and holes of the platinum alloy metal sheet, finally stretch to form a glass fiber product of high strength, energy saving, environment protection and low viscosity of the present invention.

Therefore, the present invention overcomes the technical difficulties of the conventional prior art; particularly in stretching and spinning process, it has made significant and substantial technical progress in the viscosity for the three most important processes-melting, homogenization of bubble discharge, when compared with the viscosity for the process for all the existing medium-alkali, E alkali-free and S glass fibers.

Applications

The above glass fiber which features high strength, energy saving, emission reduction, environmental protection and low viscosity as set forth in the embodiment of the present invention is mainly applied to glass fiber composite material, besides to glass fiber cloth, silk and felt.

The Fifth Embodiment

The third embodiment of the present invention has disclosed a glass fiber composite material made of the glass fiber as set forth in the embodiment of the present invention; the composite material contains plastic matrix and the glass fiber which is embedded into the plastic matrix and manufactured with the above glass fiber; the nominal diameter of the glass fiber goes between 5-13 μm and the diameter deviation value of the glass fiber is within ±15% of the nominal diameter.

The above is a description of the compositions, properties, manufacturing process, and applications for the glass fiber of the present invention by specific embodiments; the following is a summary for the characteristics of a glass fiber which features high strength, energy saving, emission reduction, environmental protection and low viscosity in the embodiment of the present invention; that is, the differences between the present invention and glass fiber made with the prior art:

The present invention, for the first time, integrates innovatively all characteristics of the glass fiber products produced by stretching process, as well as properties, technical effects, low viscosity, strength and environmental protection characteristics of new compositions into a technical solution.

A glass fiber which features high strength, energy saving, emission reduction, environmental protection and low viscosity in the present invention has novel technical solutions in the field of glass fiber: the said glass fiber contains $Al_2O_3$, $SiO_2$, $MgO$, $CaO$, $Fe_2O_3$ and $Na_2O$, wherein, calculated as per weight percentage, the said glass fiber contains $Al_2O_3$ 8-39% or 26-39%, $Fe_2O_3$ 0.01-3%, $Na_2O$ 0.01-8.8%, $B_2O_3$ 0-10%, $MgO$ 8.1-20% and $F_2O$ 0-1%, wherein the content of $SiO_2$ is 1.9-4.1 or 2.0-3.6 times that of $CaO$, and the content of $CaO$ is 1.2-1.6 or 1.3-1.49 times that of $MgO$.

The technical solutions of the present invention have the following characteristics:

First, for all product characteristics and applications of the glass fiber in the prior art, it is an invention for selection such compositions as aluminum, silicon, calcium, magnesium, ferrum and sodium as well as the compositions among silicon, calcium and magnesium; it is an invention about the changes of ratios among these technical elements; in the selection of changes over the ratios among the elements of the present invention, its technical solution is as follows: Silicon is 1.9-4.1 or 2.0-3.6 times that of calcium, and calcium 1.2-1.6 or 1.3-1.49 times that of magnesium; all the glass fiber in the prior art at least has two end values for the ratio between the two elements mentioned above; beyond the scope of the present invention, that is the selection of the ratios of the above elements of the present invention is in the scope of the prior art, featuring novelty; in the application and process of glass giber, the following new product properties have been found, and the following unexpected technical effects are generated.

Second, the present invention has disclosed an invention type for the new application of the product transferred from its new properties (i.e. through the processing method at each process stage of the all kinds of glass fiber, including special melting, bubble discharge, homogenization, forming, spinning and stretching stages, the product of the present invention can be produced, for which, the nominal diameter goes between 5-13 μm and breaking strength (N/tex) is 0.45-1.3 when the diameter is ≤9 μm. The preferred breaking strength (N/tex) is 0.75-1.3 at the premise of low viscosity, energy saving and environment protection. In the new applications, the present invention has found the reduced viscosity temperature and the property of eutectoid, as well as viscosity temperatures at melting, homogenization, bubble discharge and clarification process stages, especially the viscosity temperature during stretching and pulling by the platinum hopper at forming process stage, which are never disclosed by the prior art.

for example: since one of the new product property discoveries has overcome the element omission of $Na_2O$ of glass fiber caused by the conventional technical prejudice; the high and medium-alkali glass fiber in the prior art contains about 4-13% sodium which is mainly used for fluxing, especially the fluxing for silicon to control the viscosity at each process stage; however, the technical solutions and new product properties found in the present invention have broken through this technical prejudice; it can be invented according to the change relations among silicon, calcium and magnesium; in the application of glass fiber, the new product properties is 150° C.-250° C. lower than the viscosity temperature at several process stages for high-sodium glass fiber in the prior art when the sodium content is 0-1%. This can save energy greatly, control the high-quality product, and prevent stones and slag points caused by blocking of holes of the wire-drawing bushing made by glass fiber, as well as bubbles caused by poor bubble discharge; the defect of fracture of wires is also overcome; especially, it can reduce the slag points, stone ratio, bubble ratio and viscosity; the diameter of the product through the holes of the platinum alloy plate is equal; the strengths of the products and especially yield of finished electronic products are improved; the technical solution invented with sodium element omitted realizes a better process control effect than the existing medium- and high-alkali products.

In the operation of the prior art and in case of any defects at each process stage, the temperature will be increased for each process stage in operation so as to remove such defects; however, the top of molten pool will be easily collapsed, which greatly shortens its service life; the present invention provides an adjustable scope for the viscosity which is technically controllable in the control process, which has fundamentally solved the technical difficulties that the insiders think that the existing sodium (high-sodium) glass fiber is suffering "short-nature material" (namely "short-nature glass").

(B) One of the discoveries of new product properties: It has overcome the conventional technical prejudice; it produces an invention of omitting a technical element related to "$B_2O_3$" of an E alkali-free boron glass fiber that accounts for 95% of the world's total fiber production; the existing E alkali-free boron glass fiber adopts 8-15% boron as a fluxing agent, which is a technical prejudice to the alkali-free boron glass fiber; in particular, the fluxing for silicon by adding boron can achieve the reduction of viscosity temperature of the alkali-free boron glass fiber at each process stage; however, the technical solution and the new properties found in the present invention have broken through such technical prejudice; it can be invented according to the change relations among silicon, calcium and magnesium; in the application of alkali-free glass fiber, the new product properties can be 200° C.-300° C. lower than the viscosity temperature of the product with 8-15% boron in the prior art at several process stages of the glass fiber when there is no $B_2O_3$, $F_2O$ and $Na_2O$ (or only 0-1%), this will form a new technical platform for controlling product quality by control process in a bigger scope; for the high-quality product which requires no bubbles, slag points, stones and minimum unevenness of diameters, it has provided a process control scope and a process control platform which is much better than the prior art, for improving the finished product rate, excellent product rate and especially the viscosities at bubble discharge, clarification, homogenization, forming, spinning and stretching process stages.

The third discovery of new product properties: It has overcome a technical prejudice that the viscosity temperature of the conventional glass fiber will be naturally increased radically by adding $Al_2O_3$; for example, the existing high and medium-alkali glass fiber can only be added with about 1% $Al_2O_3$ while the existing alkali-free boron glass fiber can also be added with about 8% $Al_2O_3$ to improve the strength; if it is added too much, it will make the viscosity temperature which have been very high at each process stage much higher and fail to achieve the quality goal by controlling the process; some believe that the product strength can be improved by adding 19-31%, 26-31% or even 26-39% $Al_2O_3$ when the controllable process cannot reduce the cost; however, the technical solutions and the new product properties of the glass fiber found in the present invention have broken through such a technical prejudice; when the present invention does not contain boron, sodium and fluorine (or 0-1%), and the content of $Al_2O_3$ is about 19% or 26% which is a great change, the prior art holds that the viscosity will be increased radically, but the change of the viscosity temperature in the present invention only goes between 20° C.-40° C. or 50° C.; when the content of $Al_2O_3$ is about 31%, the viscosity temperature only increases about 40° C.-80° C. (See 12 comparison examples of the table).

Moreover, the viscosity temperature is 100° C.-200° C. lower than the glass fiber product with 10% $Na_2O$ or 8-15% $B_2O_3$; this proves that the technical solutions for the change in the ratio of silicon, calcium and magnesium in the technical solutions of the present invention can produce a new product property when the content of $Al_2O_3$ is 25% or 30%; this is a new property for eutectic composition consisting of aluminum, silicon, magnesium and calcium and containing a high content of $Al_2O_3$; it can produce unexpected effects in high aluminum content but low viscosity temperature, and then an unexpected technical effect of improving product quality and saving energy; meanwhile, after abundant $Al_2O_3$ is added, the breaking strength doubles that of the existing product of same kind (see samples in Tables 1 and 2).

The insiders all know that the breaking strength value of glass fiber mainly depends on the content of $Al_2O_3$, $Al_2O_3$ plays the most principal role in the strength in the net structure of product compositions, it is in direct proportion to the content of $Al_2O_3$ but is inversely proportional to the content of boron, because boron will greatly volatilize during melting, causing unevenness of product compositions and making the net structure of compositions get loose.

In the present invention, the content of $Al_2O_3$ can be up to 19-28%, and the breaking strength can be 50-100% much higher than the prior art; the viscosity temperature is only 150° C.-250° C. lower than that with the prior art when the content of $Al_2O_3$ is only 1-25%; therefore, if the viscosity of alkali-free high-boron glass is formed by the technical solution of the present invention, then there will be much room for melting viscosity and strength when the content of $Al_2O_3$ is raised to be 29-39%, (the flexural strength of the glass in the embodiment of the present specification and invention is cut into pieces with a dimension of 50 mm×50 mm×5 mm and measured in accordance with GB/T3810.4-2006) $B_2O_3$ in the alkali-free high-boron glass made with the prior art volatilizes, which will result in uneven compositions, damage the net structure related to $Al_2O_3$ and thus greatly impact the due strength; this is the important reason why the strength of the alkali-free high-boron E glass fiber is relatively poor even though it contains 7-15% $Al_2O_3$.

In addition to high aluminum content and high strength, it also features energy saving, lower cost and wider process range for viscosity temperature, which cannot be achieved by the existing glass fiber technology; it can control melting at viscosity temperature stage of melting process, overcome the stones, prevent the slag points that are not melted and control the glass fiber to make even diameters during clarification and forming (as the viscosity is lower, the glass fiber product at this process stage will be softer and have a controllable scope; in contrast, as the viscosity is higher, the glass fiber product at this process stage will be harder and have difficulties in controlling the scope; and when the viscosity is lower, it is helpful for controlling the error of the diameter of the glass fiber of less than or equal to 9 μm in diameter at the premise of same equipment and stable quality); meanwhile, it helps to improve the stretching speed and output.

(D). To add 0.01-4% $Fe_2O_3$ is a combined invention and can form the new function, that is, save the quality resources and greatly reduce the cost under the premise of delivering new properties, energy saving, high strength and higher production efficiency.

(E). To add 1-25% $ZrO_2$ is also a combined invention and on the premise of saving energy, ensuring low viscosity and product quality, and reducing the cost, it can form a new alkali-resistant glass fiber whose breaking strength is 50-100% more than that of alkali-resistant glass fiber made with the prior art.

Third, since the revealing and discovery of the above new product properties have overcome many of the above prior art prejudices, it produces several unexpected effects as below in the industrial application of resin composite materials during production of all kinds of glass fiber, in the application of alkali-resistant cement composite materials, and in the field of glass fiber:

(1) Technical effects in melting quality, bubble quality, diameter control during the forming process, as well as stretching speed and productivity enhancement due to the property of viscosity temperature.

(2) Unexpected energy saving effect with over 200° C. due to the reduction of viscosity temperature and unexpected technical effect in producing 2-3 times increase of breaking strength due to massive addition of aluminum to the property of eutectoid (from 1% to 31%).

(3) Unexpected technical effect in producing 1-2 times lighter glass fiber which saves 1-2 times energy, resource and logistics due to the increase of the breaking strength by 1-2 times.

(4) The new technical effect of the present invention lies in that it can save the increasingly reduced glass fiber raw material resources due to the addition of $Fe_2O_3$ to the non-transparent or low transparent and colorful decorative glass fiber and composite resin products so as to increase the ferrum content of the raw materials; therefore, the cost of main raw material of the glass fiber is reduced by 10 times.

(5) Since an invention with a technical element omitted is adopted, it omits boron to ensure better properties at melting, bubble discharge and forming stages and enable the breaking strength to be improved by 1-2 times by adding more $Al_2O_3$ under the premises that it can better control the quality than the prior art in stones, slag points, bubble rate and diameter evenness of alkali-free glass fiber; moreover, on the premise of high-quality process control and production output increase, it delivers an unexpected environmental effect as there is no emission of poison gas from boron, which is significant for environmental protection caused by E boron glass fiber accounting for more than 90% of the total fiber production.

(6) Compared with the existing glass fiber including alkali-resistant glass fiber, the advantage of the glass fiber of the present invention lies in energy saving due to 150° C.-300° C. reduction of the viscosity temperature; moreover, thanks to the high content of $Al_2O_3$ and the property for eutectic composition consisting of aluminum, silicon, magnesium and calcium, the present invention can be added with about 25-30% $Al_2O_3$, which however cannot be attained by the production process of the existing alkali-resistant glass fiber because high aluminum content cannot be melted, bubbles cannot be discharged and forming process for the glass fiber cannot be achieved in consideration of the product viscosity; the viscosity temperature of the present invention changes very little or is even lower than that of the existing common soda-lime glass fiber, boron glass fiber and alkali-resistant zirconium glass fiber with only 1-10% $Al_2O_3$; in this sense, the equipment for the existing alkali-resistant glass fiber can be adopted to produce an alkali-resistant glass fiber with up to 20-30% $Al_2O_3$ and a new high strength which is 1-2 tines that of the existing alkali-resistant glass fiber.

(7) Thanks to the high content of $Al_2O_3$ and the property for eutectic composition consisting of aluminum, silicon, magnesium and calcium, the breaking strength of the glass fiber of the present invention can be improved by 1-2 times when compared with the existing glass fiber, especially boron E boron glass fiber which accounts for more than 90% of the total fiber production; in addition, the glass fiber of the present invention save energy and cost (its cost is lower than that of S glass fiber), and features high strength. For this reason, the composite product made with the said glass fiber and resin composite materials can deliver a high breaking strength improved by 1-2 times or a light weight reduced by double (or more) without prejudice to the strength; as a result, the efficiency for wind power generation adopting this composite material is increased by 60-100%; at the same tine, important technical progresses and unexpected effects are achieved in terms of improvement of the strength and light weight of all kinds of vehicles such as vessels and automobiles.

(8) Thanks to the high content of $Al_2O_3$ and the property for eutectic composition consisting of aluminum, silicon, magnesium and calcium, the breaking strength of the alkali-resistant glass fiber of the present invention can double at least (this cannot be attained by the alkali-resistant glass fiber product of the prior art because high aluminum content cannot be melted, bubbles cannot be discharged and forming process for the glass fiber cannot be achieved in consideration of the viscosity property); therefore, an unexpected effect will be delivered in bridges, buildings, docks, leak repairing and industrial engineering as the breaking strength of the reinforced cement has been improved greatly.

Fourthly, compared with the prior art for glass fiber, the technical solutions of the present invention has the new, unrevealed and undisclosed properties which are not predicted, forecasted and reasoned in advance; it can overcome the conventionally technical prejudice in glass fiber technology and solve the above major issues concerned by people in industry; the technical effect generates the changes over "quality" and "quantity"; it proves that the technical solutions are not obvious but outstanding, having the technical progress and innovativeness.

The technical solution in the embodiment has obvious novelty as it combines several technical features in a glass fiber product, that is to say, all the prior arts for the glass fiber have no way to integrate the features obtained by the foregoing compositions and techniques into a glass fiber product.

In particular, the novel technical solution delivers unexpected effects, and solves major technical difficulties for glass fiber applied in the glass fiber industry, resin composite materials in electronic, chemical, engineering, vehicles and wind power industries, as well as cement composite materials in chemical and construction industries; such difficulties are expected to be solved but fail to be solved, for which, further description is given below:

Firstly, the existing E boron glass fiber (accounting for 90% of the world's total fiber production) contains 8-12% boron which will volatilize greatly in the production process to produce poison gas with boron (for example, 10% boron content requires addition of 25-30% boron element raw material to facilitate fluxing; yet, 15-20% of boron element will volatilize during melting). However, to realize melting at a low viscosity temperature, it is not required to add boron to the present invention, which can fundamentally solve environmental protection during production of E boron glass fiber accounting for more than 90% of the world's total fiber production. What's more, the fluorine glass fiber has influence on environmental protection as fluorine is easy to volatilize to produce poison gas though it can reduce the viscosity. Now production of the fluorine glass fiber is almost stopped. For this, the present invention discloses a technical solution without boron and fluorine; its advantages are as follows: (1) it solves the environmental protection caused by Ee boron glass fiber accounting for more than 90% of the world's total fiber production; (2) it is significant for the improvement of product quality due to a wider control range of viscosity; (3) as mentioned above, with same equipment, the productivity can be increased by about 20% for the viscosity is reduced through process control; (4) the molten pool can be conducted with cold repair every 10 years or so, which however used to require cold repair every 3 years or so; in this way, the service life and use ratio of the equipment can be prolonged; (5) as mentioned above, the strength can be increased by 1-2 times and cost is relatively low, thus it is economically significant for the application of high strength and light weight of composite products.

Secondly, since the energy consumption is mainly in the high-temperature area, the technical solution saves 30-40% energy by reducing 150° C.-300° C. melting temperature while maintaining same viscosity, thus solving the major challenges faced by the glass fiber industry.

Thirdly, as a result of saving 30-40% energy, it reduces the emission of $CO_2$ by 30-40%.

Fourthly, as the viscosity temperature can be reduced by the technical solution of the present invention, especially the viscosity can be reduced in case of high aluminum content, it is helpful for controlling the diameter evenness of the glass fiber during forming and improving strength; for the prior art, the boron and fluorine are easy to volatilize to impair the evenness of the glass fiber composition, the net structure and the strength; while maintaining the melting viscosity temperature, it is not required to add boron and fluorine to the present invention, which enables to improve the strength. Moreover, with same viscosity, the temperature difference is just 200° C.-300° C.; with same equipment and process, 10-20% aluminum can be added to the present invention, while the viscosity will be maintained; under conditions of same energy saving, equipment and viscosity, more content of $Al_2O_3$ (for example, 1-10%, 19%, 26%, 26-31%, or 31-39% $Al_2O_3$) can solve the major difficulties for composite materials of glass fibers applied in various industries, vehicles, chemical engineering and wind blades. Besides, economic value can be increased due to improvement of strength of alkali-free high-boron glass fiber and S glass fiber.

Fifthly, the alkali-free high-boron products made with the prior art considers 8-15% boron as essential composition; nevertheless, $B_2O_3$ will volatilize to result in uneven compositions, damage the net structure related to $Al_2O_3$ and thus greatly impact the due strength. This is the important reason why the strength of the alkali-free high-boron glass is relatively poor even though it contains 7-15% $Al_2O_3$. Meanwhile, it will cause unstable diameter of E boron glass fiber with high requirement for diameter deviation and thus affect the product quality greatly. The technical solution invented with boron element omitted can solve such technical difficulty rightly.

Sixthly, thanks to innovative combination of technical solutions, various products can be produced with optimized viscosities at homogenization, bubble discharge and clarification stages; in particularly, for E boron glass fiber with high requirement for ±10% diameter deviation or higher process requirements, the spinning efficiency and quality control of E boron glass fiber can be guaranteed; the reduction of viscosity during the stretching through the holes of the platinum alloy plate at the forming stage prevents fracture of wires and maintains the plasticity, which facilitates quality control; moreover, an unexpected technical effect of increasing the productivity by about 20% can be delivered with same equipment.

The present invention cannot be made by simple logical reasoning or simple test; the nominal diameter of the glass fiber goes between 5-13 µm and the diameter deviation value of the glass fiber is within, ±15% of the nominal diameter, the present invention relates to preset indispensable compositions of $Na_2O$, $Fe_2O_3$, $Al_2O_3$, $SiO_2$, CaO, MgO or $TiO_2$ and BaO in a special scope, as well as technical solutions for the compositions whose special ratios are preset among $SiO_2$, CaO and MgO. Technical solutions are of novelty.

Hundreds of enterprises and thousands of technicians engaged in the research of composite materials applied in the global glass fiber industry, energy industry, transportation and chemical industry have been overcoming several technical difficulties that have not been solved for nearly 10-20 years; the present invention has solved the major technical difficulties that are expected to be solved but fail to be solved; it has also solved dozens of technical difficulties that are mentioned in the specification and expected to be solved but fail to be solved, that is, when $B_2O_3$ that may pollute the environment is not added, technical solutions of the present invention can save energy greatly, protect the environment, improve output, reduce cost and emission of $CO_2$; the strength of the composite material added with the glass fiber can be increased due to the improvement of the breaking strength of the glass fiber; meanwhile the light weight can be realized; there is piratical value added to the wind energy industry; therefore, the present invention has made great contributions to the settlement of industrial difficulties.

The above unexpected technical effects are attributed to the adoption of technical solution which differs from all existing technologies of glass fiber, and especially the adoption of the technical solution of the invention that selects the ratio of silicon, magnesium and calcium as well as a new product properties of the invention which changes the application of glass fiber and composite material, such as viscosity reduction at each process stage is reduced, the eutectoid characteristics for aluminum, silicon, calcium and magnesium in the technical solution of the present invention, the generated breaking strength characteristic, the omission of boron in the prior art from the technical solution of the invention, the new technical solutions produce the unexpected technical effects; these technical product properties are not predicted and forecasted in advance; the present invention has overcome many technical prejudices and generated the unexpected changes over "quality" and "quantity", and it proves that the technical solutions are not obvious, having the technical progress and innovativeness.

The above statement is only for explaining the preferential embodiments in the present invention, but it is not a limitation for the present invention; any technicians who are familiar with this technology may use the above revealed technical contents, amend or modify the equivalent embodiments with the same changes; a glass fiber which features high strength, energy saving, emission reduction, environmental protection and low viscosity, its preparation methods and glass fiber composite material can be implemented according to different requirements and performances; it can be seen that it is still in the scope of technical solutions of the present invention if it is not separated from the content of technical solutions of the present invention, especially the content of claims no matter any simple amendment, equivalent changes and modifications are made for the above embodiments according to the technical essence of the present invention.

What is claimed is:

1. A glass fiber composite material, which contains plastic matrix and the glass fiber composite material which is embedded into the plastic matrix and manufactured with a glass fiber whose nominal diameter goes between 5-13 μm, the deviation value of the diameter of the said glass fiber is within ±15% of the nominal diameter, characterized in that: the said glass fiber contains $Al_2O_3$, $SiO_2$, MgO, CaO, $Fe_2O_3$ and $Na_2O$, wherein, calculated as per weight percentage, the said glass fiber contains $Al_2O_3$ 20-39 wt. %, $Fe_2O_3$ 0.01-3%, $Na_2O$ 0.01-8.8%, $B_2O_3$ 0-10%, MgO 7-20 wt. % and $F_2O$ 0%, wherein the content of $SiO_2$ is 1.9-4.1 times that of CaO, and the content of CaO is 1-1.8 time(s) that of MgO.

2. The glass fiber composite material as set forth in claim 1 characterized in that: when its diameter is ≤9 μm, the breaking strength is 0.45-1.3 N/tex.

3. The glass fiber composite material as set forth in claim 1 characterized in that: calculated as per weight percentage, the said glass fiber contains $Al_2O_3$ 26-39%.

4. A preparation method for a glass fiber whose nominal diameter goes between 5-13 μm, the deviation value of the diameter of the said glass fiber is within ±15%, characterized in that:
Step 1: indispensable compositions in a special scope are configured by the glass fiber formula, after being mixed and stirred, they are melted under the melting temperature for each glass formula to form the liquid glass fiber with preset viscosity, then they are homogenized and clarified and discharge bubbles to form flowing molten mass;
Step 2: the melted glass fibrous body formed in step 1 is stretched to be the glass fiber at medium and high speed through several holes of a multi-hole refractory metal sheet, after being cooled, the said glass fiber product is manufactured,
the said glass fiber whose nominal diameter goes between 5-13 μm contains $Al_2O_3$, $SiO_2$, MgO, CaO, $Fe_2O_3$ and $Na_2O$, wherein, calculated as per weight percentage, the said glass fiber contains $Al_2O_3$ 20-39 wt. %, $Fe_2O_3$ 0.01-3%, $Na_2O$ 0.01-8.8%, $B_2O_3$ 0-10%, MgO 7-20 wt. % and $F_2O$ 0%, wherein the content of $SiO_2$ is 1.9-4.1 times that of CaO, and the content of CaO is 1-1.8 time(s) that of MgO, the deviation value of the diameter of the said glass fiber is within ±15% of the nominal diameter.

5. The preparation method as set forth in claim 4 characterized in that: when its diameter is ≤9 μm, the breaking strength is 0.45-1.3 N/tex.

6. The preparation method as set forth in claim 4 characterized in that: calculated as per weight percentage, the said glass fiber contains $Al_2O_3$ 26-39%.

7. The methods as set forth in claim 6, characterized in that: when the viscosity is $10^{0.5}$ Pa·s, the temperature of the said glass fiber is 1,530° C.-1,700° C.; when the viscosity is $10^1$ Pa·s, the temperature of the glass fiber is 1,430° C.-1,620° C.; when the viscosity is $10^2$ Pa·s, the temperature of the glass fiber is 1,180° C.-1,480° C.; when the viscosity is $10^3$ Pa·s, the temperature of the glass fiber is 1,070° C.-1,320° C.

* * * * *